March 20, 1951 — M. A. WECKERLY — 2,545,908
FLEXURE PLATE SCALE
Filed May 3, 1947 — 2 Sheets-Sheet 1
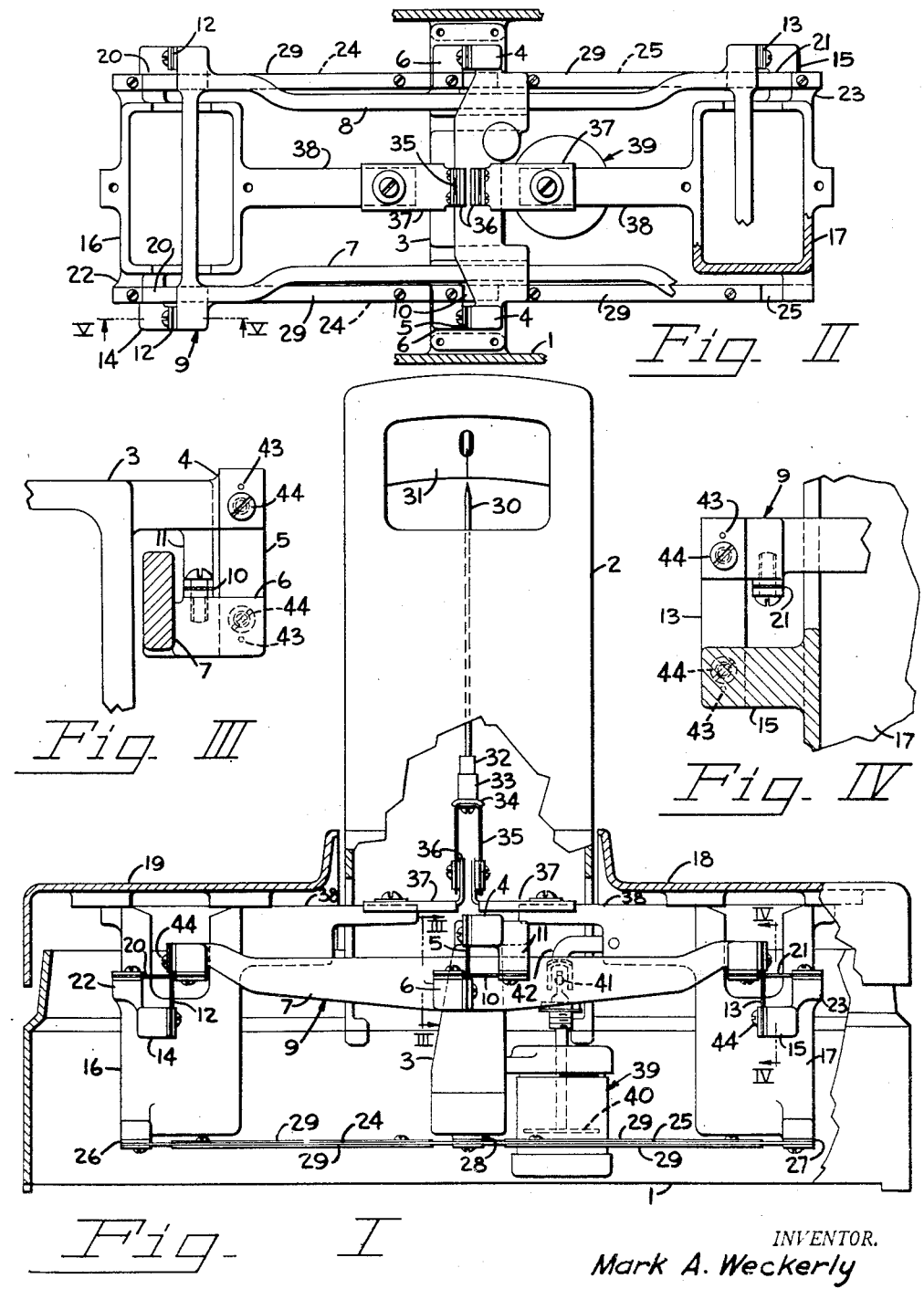
INVENTOR.
Mark A. Weckerly
BY
Marshall and Marshall
ATTORNEYS March 20, 1951 M. A. WECKERLY 2,545,908
FLEXURE PLATE SCALE
Filed May 3, 1947 2 Sheets-Sheet 2
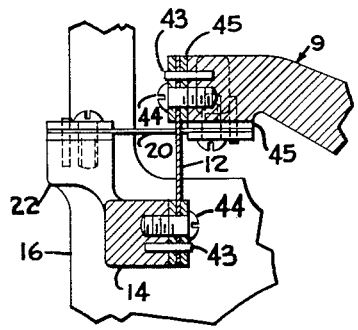
Fig. V
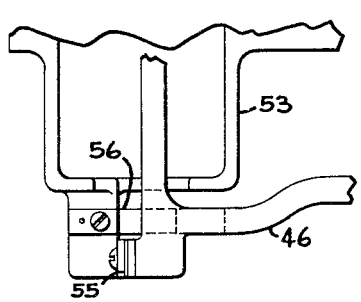
Fig. VII
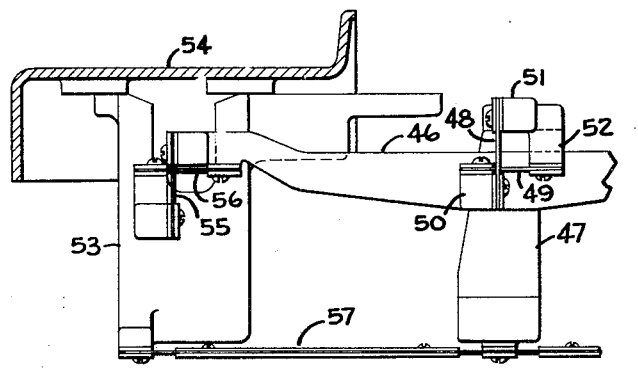
Fig. VI
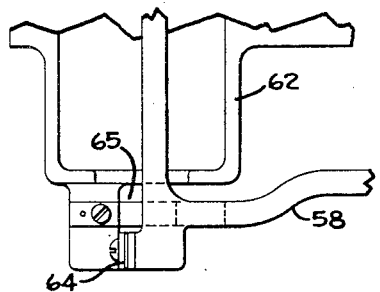
Fig. IX
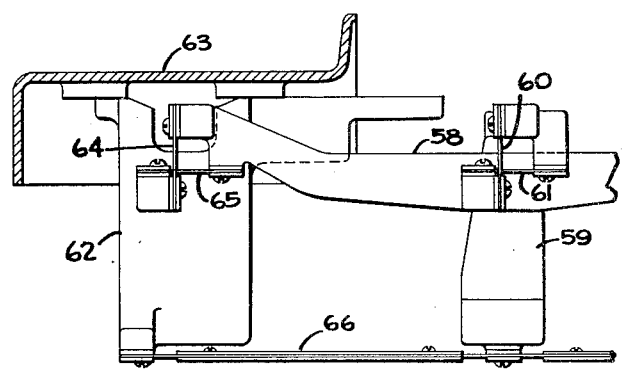
Fig. VIII
INVENTOR.
Mark A. Weckerly
BY
Marshall and Marshall
ATTORNEYS Patented Mar. 20, 1951

2,545,908

UNITED STATES PATENT OFFICE 2,545,908

FLEXURE PLATE SCALE

Mark A. Weckerly, Toledo, Ohio, assignor to Toledo Scale Company, Toledo, Ohio, a corporation of New Jersey Application May 3, 1947, Serial No. 745,868

5 Claims. (Cl. 265—54)

This invention relates to weighing scales and in particular to an arrangement of flexible members that provide substantially frictionless pivotal connections.

One difficulty in the maintenance of weighing scales is the prevention of wear between the knife edges and the V-bearings which reduces the sensitivity and accuracy of the scale. This wear between the knife edges and the pivots is particularly serious in small even-arm balances that are used for check weighing commodities in various production lines. These scales are subjected to rough handling and are often subjected to corrosive atmosphere.

The principal object of this invention is to provide pivotal connections between a weighing scale lever and a connected part which connection is not subject to wear and does not contribute materially to the counterbalancing of a load on the load receiver.

Another object of the invention is to provide a configuration of crossed flexure members that provides a definitely located turning center or pivoting point between the members.

These and other objects and advantages are attained according to the invention by employing for each pivot a pair of flexure members that are flexible only in bending and that are disposed in substantially perpendicular planes with each of the members intersecting the plane of the other member at a line near but not at its point of attachment to either the lever or the member carried from the lever.

Preferred embodiments of the invention are illustrated in the accompanying drawings.

In the drawings:

Figure I is a front elevation, with parts broken away, of a weighing scale embodying the improved pivotal connections.

Figure II is a plan view of the lever system of the improved scale.

Figure III is a fragmentary vertical section taken substantially along the line III—III of Figure I.

Figure IV is a fragmentary vertical section taken substantially along the line IV—IV of Figure I.

Figure V is a vertical section taken along the line V—V of Figure II.

Figure VI is a fragmentary side elevation showing an alternative configuration of flexible members that may be used in lieu of a knife edge pivot and bearing.

Figure VII is a fragmentary plan view of a load pivot connection of the lever system shown in Figure VI.

Figure VIII is a fragmentary elevation showing another configuration of flexible members that may be used as a pivotal connection in a weighing scale.

Figure IX is a fragmentary plan view of the load pivot for the scale shown in Figure VIII.

These specific figures and the accompanying description are intended merely to illustrate the invention but not to impose limitations on the claims.

A weighing scale embodying the invention is supported in a generally rectangular housing 1 from the center of which a hollow indicator tower 2 is erected. A bridge 3 spanning the space between the sides of the housing 1 provides at its upper end supporting lugs 4 having vertical faces to which fulcrum ribbons 5 are clamped. The fulcrum ribbons 5 are flexible metallic members and in normal operation are flexed in bending only. The lower ends of the fulcrum ribbons 5 are clamped to vertical surfaces of lever fulcrum lugs 6 extending laterally from side rails 7 and 8 of a lever 9. The fulcrum ribbons 5 support the lever 9 but do not limit its horizontal movement.

The lever 9 is restrained against horizontal movement by a pair of horizontal flexure plates or ribbons 10, one located adjacent each of the side rails 7 and 8 and attached to the upper horizontal surfaces of the lever fulcrum lugs 6 and to the lower horizontal surfaces of a pair of lugs 11 that depend from the upper portion of the bridge 3. The surfaces of the lever lugs 6 extend nearly to the intersection of the planes containing the flexure plates or ribbons 5 and 10, i. e. the apparent intersection of the ribbons (which intersection provides the effective pivot point) is located closely adjacent but spaced from the edges of the surfaces of the lugs 6 to which the ribbons are clamped.

The particular proportioning of the unsupported length of the flexure plates 5 and 10 and the distance of their apparent intersection from the ends of their unsupported lengths are selected so that the lever 9 rotates about an axis that is not translated as the lever rotates. If the flexure plates 5 and 10 were mounted such that their apparent intersection was near the center of their unsupported lengths the apparent axis of rotation of the lever is translated a distance that is generally proportional to the rotation of the lever. On the other hand, if the apparent intersection of the flexure plates is at an end of each of the unsupported lengths of the plates, a translation of the axis of rotation of the lever occurs along a line that is generally perpendicular to the first line of translation. By selecting an intermediate intersecting point that is near but not at the ends of the unsupported portions of the ribbons a minimum of translation for a given rotation of the lever is obtained.

Load ribbons 12 and 13 are attached to vertical surfaces at the ends of the lever 9 and to vertical surfaces of lateral projections 14 and 15 of a pair of spiders 16 and 17. The spiders 16 and 17 support load and counterweight receivers 18 and 19. The upper ends of the spiders 16 and 17 are supported against horizontal movement by upper check ribbons 20 and 21 that are clamped to the undersurfaces of the ends of the lever 9 and to the upper surfaces of spider bosses 22 and 23. In the neutral position of the lever 9 the upper check ribbons 20 and 21 are in the same horizontal plane as the horizontal flexure plate or ribbon 10 that connects the lever 9 to the bridge 3. The line of apparent intersection and the lengths of the unsupported portions of the load ribbons 12 or 13 and the upper check ribbons 20 or 21 are selected so that there is a minimum or no translation of the effective pivot with respect to either the spiders or the lever as the lever oscillates. The effective pivot line of the lever is a line passing through the apparent intersections of the three sets of cross flexure members, namely the fulcrum ribbon 5 and horizontal ribbon 10, the load ribbons 12 or 13 and the upper check ribbons 20 or 21.

The lower ends of the load receiver spiders 16 and 17 are supported against horizontal movement by lower check ribbons 24 and 25. The lower check ribbons 24 and 25 consist of long thin ribbons that are attached to downwardly depending bosses 26 and 27 and to a downwardly depending boss 28 of the bridge 3. To permit a minimum of restraint against vertical movement of the load receiver spiders 16 and 17 the lower check ribbons are made of thin material and are supported throughout a greater portion of their length by reinforcing plates 29. The lower check ribbons 24 and 25 in cooperation with the lever 9 serve to guide the load receivers 18 and 19 so that the accuracy of indication of load is independent of the position of the load on the load receivers.

An indicator 30 consisting of a thin light wand of balsa wood or aluminum tubing extends upwardly within the indicator tower 2 and its tip cooperates with an indicia-bearing chart 31 to indicate the condition of balance of the weighing scale. The lower end of the indicator 30 is mounted in a rubber or resilient plastic sleeve 32 that is molded into a ferrule 33. A ferrule 33 by means of shaped upper and lower clamps 34 is secured to the horizontal portion of an inverted U-shaped spring 35, the legs of which are clamped to upright portions 36 of adjustable extensions 37 that in turn are mounted on inwardly directed arms 38 of the spiders 16 and 17. Relative vertical movement of the spiders 16 and 17 acting through the arm extensions 37 cause the U-shaped spring 35 to deflect laterally and rotate its horizontal portion so that the indicator 30 is driven along the chart 31. The U-shaped spring 35 contributes most of the restoring force for counterbalancing a difference in load between the loads applied to the load and counterweight receivers 18 and 19. The remainder of the difference in loads is counterbalanced by the resilience of the flexure ribbons that provide the pivotal connections between the lever 9 and the members connected thereto.

Continued oscillation of the lever system and the indicator 30 is suppressed by a hydraulic dashpot 39 having a plunger 40 that through a ball and socket connection 41 is connected to an arm 42 extending laterally from the upper portion of the spider 17.

Referring to Figures III and IV it is seen that the flexure ribbons 5 and 10 or 13 and 21 are offset from each other so that there is no interference between the ribbons at the inner section of the planes containing the ribbons. Because of the necessity of maintaining relatively precise positioning of the various elements with respect to each other the fulcrum and load supporting ribbons 5, 12 and 13 are attached to the lever and the associated parts by clamps that include dowel pins 43 in addition to screws 44 that secure the clamps in place. While the horizontal ribbons 10, 20 and 21 or the check links 24 and 25 are not subjected to as great loads as are the fulcrum and load supporting ribbons, they are also doweled in position to avoid any possibility of slippage either during assembly or use.

Figure V illustrates in detail the connection of the ribbons 12 and 20 to the end of the lever 9 and to the projections 14 and 22 of the spider 16. As was mentioned previously the effective pivot point of the connection is substantially at the intersection of the planes containing the ribbons 12 and 20. By means of ground spacing plates 45 interposed between the ribbons and the surfaces of the lever 9 the point of intersection is moved outwardly away from the lever a distance of approximately ⅛ of the unsupported length of the ribbons.

It is not necessary that the intersection of the planes containing the ribbons be adjacent the lever end of the ribbons. The only requirement is that the intersection of the planes be adjacent the ends of the unsupported lengths of the ribbons. Referring to Figures VI and VII an alternative arrangement of the flexible members is shown. In this alternative arrangement a lever 46 is pivotally supported from the bridge 47 by means of a fulcrum ribbon 48 and a horizontal stabilizing ribbon 49 that are connected to a lever lug 50 projecting laterally from the lever and fulcrum lugs 51 and 52 forming part of the bridge 47.

A spider 53 carrying a platter 54 is supported from the lever 46 by means of a load ribbon 55 and an upper check link 56. The spider 53 is guided against rotation by a lower check link 57 that is connected between the lower end of the spider 53 and the lower portion of the bridge 47. This construction is similar to that previously described in so far as the fulcrum pivot and lower check link are concerned but differs from the structure first described in that the load pivot, the intersection between the planes containing the load ribbons 55 and the upper check link 56, is adjacent the lever end of the load ribbon 55 and the spider end of the upper check link 56. The action of this configuration as a pivot is precisely the same as that shown in Figures I to V inclusive.

A still further configuration that operates in precisely the same manner is shown in Figures VIII and IX. As shown in these figures a weighing scale is constructed with a lever 58 that is supported from a bridge 59 by means of a fulcrum ribbon 60 and a stabilizing ribbon 61. A spider 62 carrying a platter 63 is supported from the lever 58 by means of a load ribbon 64 and an upper check link 65. As before a lower check link 66 is provided to guide the spider. This arrangement differs from those previously described in that the intersection of the planes containing the load ribbon and upper check link ribbon is located near the spider end of the ribbons.

These configurations are equivalent to each other and in each case the effective pivot is located at the intersection of the planes. This follows because the apparent pivot point is at the point of bending of each of the ribbons and each ribbon in each instance forces the cooperating ribbon to undergo the greater amount of its bending at the intersection of the ribbons. Since the bending of a ribbon cannot be confined exclusively to a single transverse line the best results are obtained by confining the bending in so far as possible to one end of each ribbon and locating the intersection of the ribbons in the same region. It is thus apparent that it is immaterial whether the lever connection or the associated member connection of each ribbon is adjacent the intersection of the ribbons.

The substitution of members that are flexed in bending in lieu of knife edge pivots and the location of the flexible members with the intersection of the members of each cooperating pair near the ends of their unsupported length provides a pivotal connection that does not detract from the precision of weighing of a scale but yet is immune to wear and damage from normal use.

Various modifications may remain in the specific structure in adapting the improved pivot for use in other weighing scales without departing from the spirit and scope of the invention.

Having described the invention, I claim:

1. In a weighing scale having a frame, a load receiver, and load counterbalancing means including a lever, members flexible only in bending for pivotally connecting the lever to the cooperating parts of the weighing scale, said members cooperating in pairs to form the pivotal connections to the lever, the members of each pair being in mutually generally perpendicular planes and each member having its free flexible portion divided into two parts by the plane containing the other member of the pair with the length of one of the parts being at least four times the length of the other part.

2. In a weighing scale having a frame, a load receiver, and load counterbalancing means including a lever, members flexible only in bending for pivotally connecting the lever to the cooperating parts of the weighing scale, said members cooperating in pairs to form the pivotal connections to the lever, the members of each pair being in mutually generally perpendicular planes and each member having some but not more than twenty-five percent of its free flexible length lying between its first point of contact with the lever and the plane containing the other member.

3. In a weighing scale having a frame, a load receiver, and load counterbalancing means including a lever, members flexible only in bending for pivotally connecting the lever to the cooperating parts of the weighing scale, said members cooperating in pairs to form the pivotal connections to the lever, the members of each pair being in mutually generally perpendicular planes and each member having at least seventy-five percent but not all of its free flexible length lying between its first point of contact with the lever and the plane containing the other member.

4. In a weighing scale having a frame, a load receiver, and load counterbalancing means including a lever, members flexible only in bending for pivotally connecting the lever to the cooperating parts of the weighing scale, said members cooperating in pairs to form the pivotal connections to the lever, the members of each pair lying one in each of a pair of intersecting planes and each member having some but not more than twenty-five percent of its free flexible portion lying on one side of the intersection of the planes.

5. In a weighing scale having a frame, a load receiver, and load counterbalancing means including a lever, members flexible only in bending for pivotally connecting the lever to the cooperating parts of the weighing scale, said members cooperating in pairs to form pivotal connections to the lever, the members of each pair being disposed one in a plane parallel and one in a plane perpendicular to the neutral position of the lever, each member of each pair having some but not more than twenty-five percent of its unsupported length lying on one side of the intersection of the planes containing the members.

MARK A. WECKERLY.

REFERENCES CITED

The following references are of record in the file of this patent:

UNITED STATES PATENTS

| Number | Name | Date |
|---|---|---|
| 299,757 | DuBrul | June 3, 1884 |
| 1,943,850 | Truman | Jan. 16, 1934 |
| 1,988,527 | Truman | Jan. 22, 1935 |
| 1,998,345 | Truman | Apr. 16, 1935 |
| 2,293,437 | LaCoste | Aug. 18, 1942 |